United States Patent [19]
Perry

[11] Patent Number: 5,619,774
[45] Date of Patent: Apr. 15, 1997

[54] EYEGLASS RETAINING APPARATUS

[75] Inventor: Ronald J. Perry, Vernal, Utah

[73] Assignee: Xcell, LLC, Spanisk Fork, Utah

[21] Appl. No.: 378,159

[22] Filed: Jan. 25, 1995

[51] Int. Cl.⁶ .............................. A44B 21/00; A45F 5/02
[52] U.S. Cl. ................... 24/3.6; 24/3.3; 24/336; 24/3.12
[58] Field of Search ............... 24/3.3, 3.6, 3.8, 24/3.12, 336, 531; 351/155, 158

[56] References Cited

U.S. PATENT DOCUMENTS

| | | | |
|---|---|---|---|
| 463,786 | 11/1891 | Davidson | 24/3.3 |
| 1,206,074 | 11/1916 | Zwiener | 24/3.6 |
| 1,418,979 | 6/1922 | Seferlis | 24/3.6 |
| 2,117,989 | 10/1936 | Ryan | 24/3.6 X |
| 3,279,009 | 8/1964 | Deane | 24/3.6 |
| 3,707,742 | 1/1973 | Justice et al. | 24/3.6 X |

FOREIGN PATENT DOCUMENTS

| | | | |
|---|---|---|---|
| 1039096 | 10/1953 | France | 24/336 |
| 2626992 | 11/1977 | Germany | 24/3.6 |

*Primary Examiner*—Peter M. Cuomo
*Assistant Examiner*—Hanh V. Tran
*Attorney, Agent, or Firm*—Foster & Foster

[57] ABSTRACT

A retaining apparatus for eyeglasses and the like having a main body portion with oppositely extending retaining clips integrally attached thereto. One retaining clip allows the retaining apparatus to be secured to a mounting structure, such as a sun visor in an automobile. The second retaining clip is resiliently displaced to allow an item to be held, such as a pair of eyeglasses, to be inserted into the second retaining clip area.

25 Claims, 2 Drawing Sheets

EYEGLASS RETAINING APPARATUS

TECHNICAL FIELD

The present invention relates to holders for eyeglasses, and more particularly, to retaining devices for holding eyeglasses in a suspended position adjacent a mounting structure.

BACKGROUND OF THE INVENTION

The necessity and benefits of eyeglasses, such as sunglasses and corrective lenses, are well known. Many millions of people use eyeglasses of one type or another on a daily basis. Because of the relatively small size of a pair of eyeglasses, and because of the frequency with which they are placed on and removed from a person's face, they tend to be lost, mislaid, and damaged frequently.

A number of devices have been developed over the years to prevent glasses from being inadvertently dropped or lost. Some of these devices include tubular retaining straps that fit over the ends of the eyeglass temples. These retaining straps keep the eyeglasses around the user's neck when not being used.

In addition, traditional protective cases for eyeglasses have existed for a long time. These cases usually provide some type of protection for the eyeglasses, but do not overcome the problems with respect to where the case may be placed after placing the eyeglasses inside the protective case.

A major concern with respect to eyeglasses is preventing damage, since they are lightweight and easy to break. Even when inside of a protective case, if the eyeglasses are left on a chair, seat, or floor, damage can readily result.

There is, therefore, a need to provide a retaining apparatus for holding eyeglasses at a known location to prevent the eyeglasses from being lost or mislaid. In addition, there is a need to develop a retaining device for holding eyeglasses in a suspended location to prevent the eyeglasses from being inadvertently damaged as a result of being left on a surface, such as a seat or the floor.

The automobile presents particular problems with respect to use and storage of eyeglasses. The driver of or passenger(s) inside an automobile will often wear and remove sunglasses or corrective eyeglasses (e.g., in exchange for a tinted pair of eyeglasses), depending upon conditions such as night/day driving and sunny/cloudy days. Ultimately, there is a need to place the eyeglasses somewhere inside the passenger compartment of the vehicle. The dashboard is one of the more common locations for placing eyeglasses. The car seat is another common storage location for eyeglasses. Several problems commonly arise, however, from such practices. For example, the lenses of the eyeglasses are scratched when the eyeglasses slide back and forth along the dashboard or the seat. Furthermore, although resting on the dashboard or the seat, the eyeglasses commonly fall off onto the floor of the vehicle where they may be damaged. Even if the glasses stay on the seat, they can be damaged or lost in the crack of the seat. There is a need, therefore, to provide a retaining apparatus that allows eyeglasses to be stored in a known location, that maintains the eyeglasses in a suspended location to prevent damage, and that is easy to use for a vehicle driver.

OBJECTS AND SUMMARY OF THE INVENTION

It is a primary object of the invention to provide an improved retaining apparatus for eyeglasses.

Another object of the invention is to provide a retaining apparatus for eyeglasses that enables placement of the eyeglasses in the same, predictable location for future use.

Still another object of the invention is to provide a retaining apparatus for eyeglasses that maintains the eyeglasses in a suspended position to prevent damage to the sunglasses.

Another object of the invention is to provide a retaining apparatus that can be installed onto a visor of an automobile.

Yet another object of the invention is to provide a retaining apparatus for eyeglasses that can hold one or more papers in combination with the eyeglasses.

Yet another object of the invention is to provide a retaining apparatus that is lightweight, easy to manufacture, and inexpensive to manufacture.

The foregoing objects are achieved by the present invention which involves an eyeglass retaining apparatus for installing on an automobile sun visor or other relatively thin, planar mounting structure. The eyeglass retaining apparatus includes a pair of opposed clips formed by respective resilient tongues. Each tongue defines a retaining area. One tongue is resiliently displaceable from the base structure so that the retaining apparatus can be inserted over, for example, an automobile sun visor. The other tongue is resiliently displaceable for inserting a pair eyeglasses inside its retaining area. The retaining apparatus is lightweight and easy to install on virtually any thin, planar mounting structure. The retaining apparatus thus provides a secure, predictably locatable retaining device for holding eyeglasses. In addition to eyeglasses, the retaining device can hold papers and other items within one of the clip areas.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings.

DETAILED DESCRIPTION OF THE INVENTION

Figure 1:
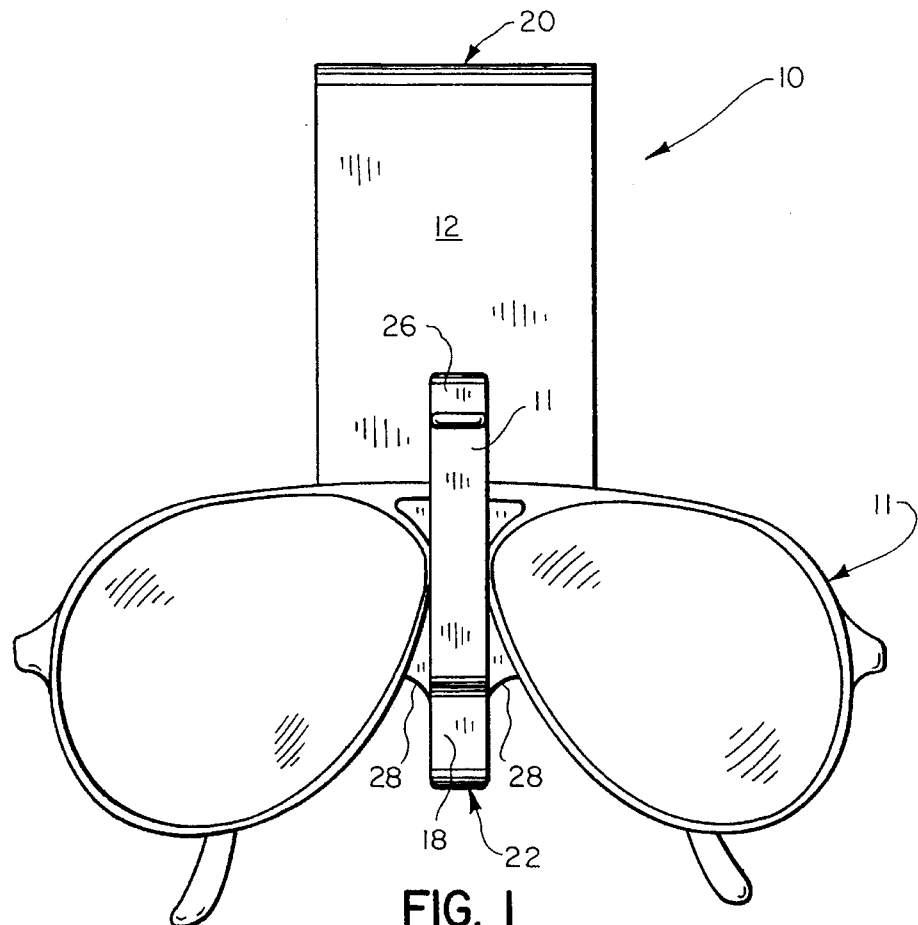
FIG. 1 is a front elevation view of an eyeglass retaining apparatus, including a pair of eyeglasses operatively held by the retaining apparatus according to the present invention.

With reference to FIGS. 1–4, the present invention comprises generally a retaining apparatus 10 for retaining eyeglasses as well as other objects, such as paper and the like. The retaining apparatus 10 is particularly suited for automobile visors, but could be used in connection with any type of thin, planar mounting structure. The retaining apparatus allows a person to store a pair of eyeglasses at a known, constant location. In addition, the retaining apparatus suspends the eyeglasses to prevent damage that may result from resting the eyeglasses on a flat surface.

The retaining apparatus 10 more specifically comprises a base structure 12, a first retaining clip or tongue in the form of a relatively narrow retaining clip 14, and a second retaining clip or tongue in the form of a relatively wide retaining clip 16. The retaining clips 14, 16 create retaining areas 15 and 17, respectively, for attaching the retaining apparatus to a mounting structure and holding a pair of eyeglasses. The main body portion has a main body width and the mounting clip has a mounting clip width. The main body width and the mounting clip width are substantially the same. The retaining clip has a retaining clip width which is relatively narrow as compared to the mounting clip width and the main body width.

A transition section 13 (FIG. 3) extends from the main base portion 12. The transition section further extends to integrally connect with an inclined clip portion or section 18 which is connected, in turn, to a return section 11 of the relatively narrow clip 14. The transition section has a width substantially the same as the width of the retaining clip.

The mounting clip or tongue 16 integrally extends from the main base portion 12 in a tortuous manner. The clip 16 and base portion 12 join each other at an apex 20. The wide clip 16 is resiliently displaceable relative to the main base portion 12 at apex 20. Transition portion 13, inclined clip portion or section 18, and the return section 11 join at apex 22 and apex 24, respectively. As the return section 11 of the narrow clip 14 is resiliently displaced, this causes the inclined section 18 to move simultaneously. The return section 11 and inclined section 18 move relative to one another and the main base 12 at apex locations 22 and 24.

The narrow clip 14 terminates at an outwardly extending flange portion 26. The flange portion 26 facilitates both the user's ability to displace the narrow clip 14 for inserting, for example, sunglasses 11 into the retaining area 15. A smooth, rounded surface is provided to the inside of the retaining apparatus where the narrow clip 14 and the flange 26 join. This surface further facilitates insertion of objects into the retaining area 15. The wide clip 16 terminates at a rounded end edge 25. This rounded end edge facilitates insertion of the retaining apparatus onto a planar structure, such as an automobile visor or another suitable structure such as a shelf on a bookshelf.

Figures 2, 3:
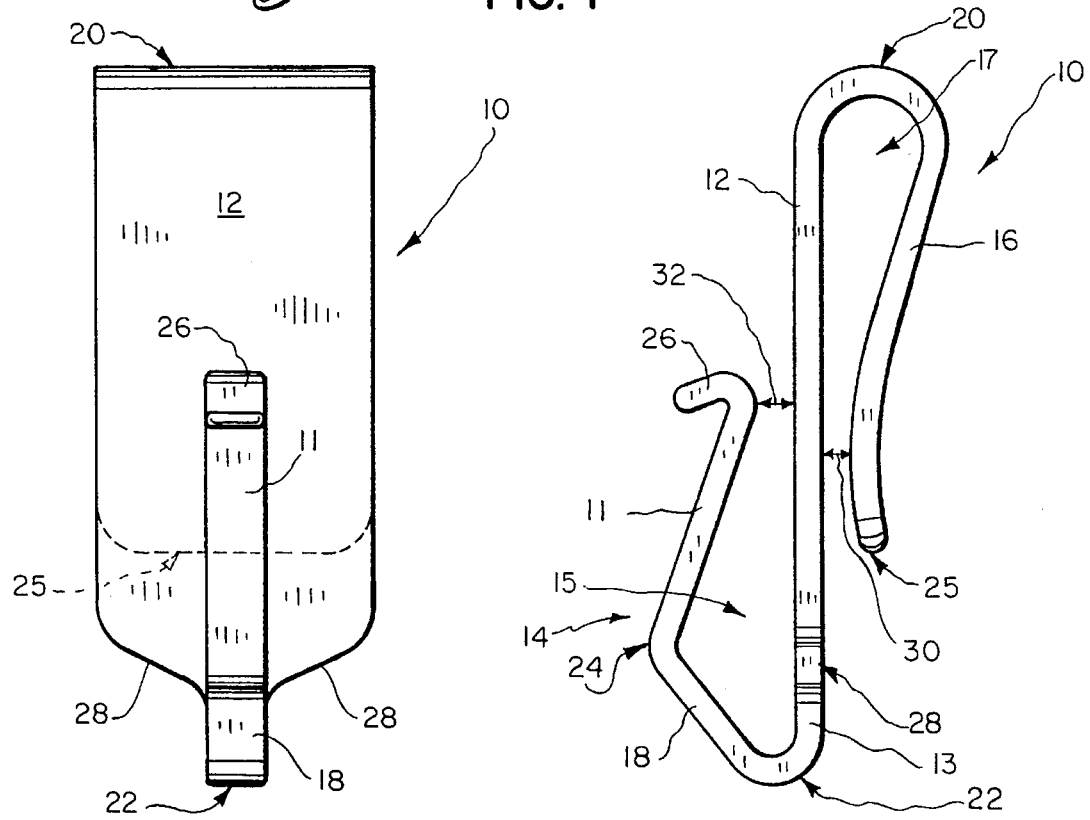
FIG. 2 is a front elevation view of the retaining apparatus of FIG. 1 without a pair of eyeglasses.
FIG. 3 is a side elevation view of the eyeglass retaining apparatus of FIG. 2.
Figure 4:
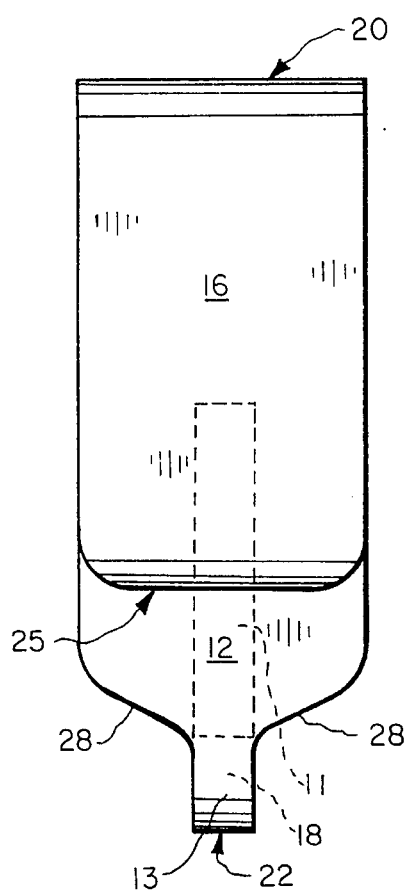
FIG. 4 is a rear elevation view of the eyeglass retaining apparatus of FIG. 2.

To function properly, the retaining apparatus 10 is preferably installed onto a planar, thin platform-like structure which has a thickness just greater than the narrowest separation distance between the broad clip 16 and the main base portion 12. This separation distance is designated as reference numeral 30 (FIG. 3). The structure will be held within retaining area 17. In order to hold a particular item, such as eyeglasses, inside the main retaining area 15, the object must have a thickness greater than the separation distance between the narrow retaining clip 14 and the main base portion 12. This distance is designated as reference number 32 (FIG. 3). Separation distances 30, 32 will increase, of course, when the clips 14, 16 are resiliently displaced relative to the main base portion 12.

It is to be understood that materials and objects in addition to eyeglasses can be inserted into retaining area 15. Other such materials and objects may include paperwork and the like.

The narrow retaining clip 14 is narrowed dramatically in comparison to the width of the main frame portion 12. With reference to FIG. 2, the main base portion 12 narrows at transition edges 28 extending from the main body portion 12 to define the width of the narrow clip 14. The narrowness of clip 14 facilitates the resilient displacement of the clip so that the force required to move the clip and insert the eyeglasses can be accomplished with one hand. This is particularly appropriate where the retaining apparatus 10 is used inside an automobile. The wide clip 16 is widened to provide a greater resistance so that the retaining apparatus 10 can be securely held on a mounting structure.

The entire body of the retaining apparatus 10 is preferably injection molded. The device may be made of an opaque plastic material or clear plastic. Alternatively, spring steel may be used to manufacture the retaining apparatus 10.

The invention shown in the embodiment of FIGS. 1–4 provides a highly useful, unique way of providing an eyeglass holder for mounting at a suitable location, such as the interior of a vehicle, so that the eyeglasses can be stored in a known, constant location and in a suspended position to prevent damage to the lenses.

Figure 5:
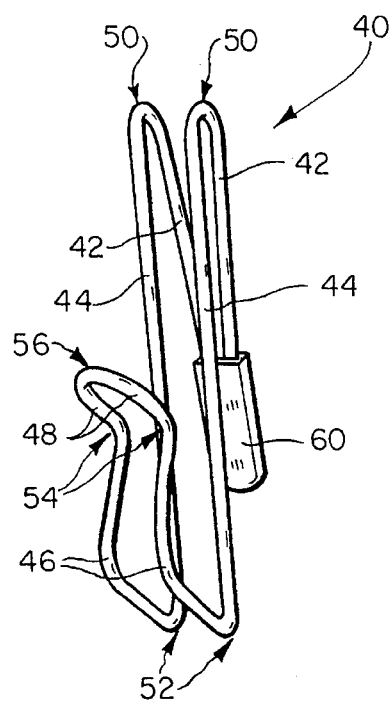
FIG. 5 is an isometric view of an alternative embodiment of an eyeglass retaining apparatus according to the present invention.
Figure 7:
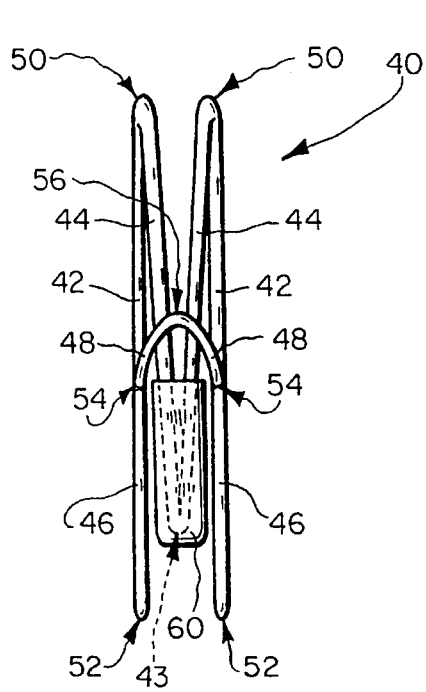
FIG. 7 is a front elevation view of the eyeglass retaining apparatus of FIG. 5.
Figure 6:
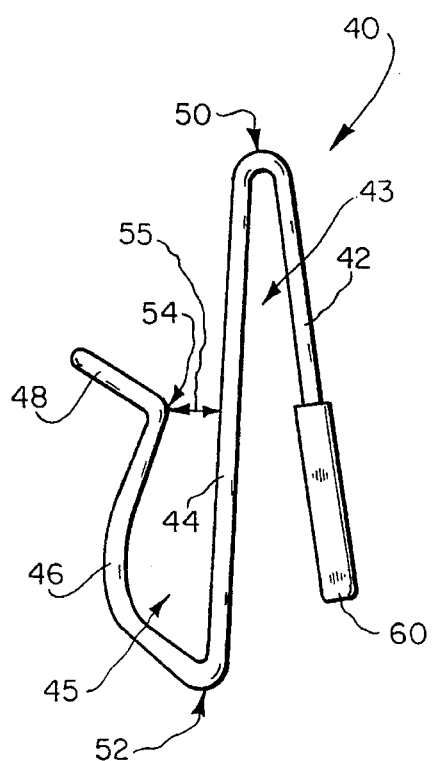
FIG. 6 is a side elevation view of the eyeglass retaining apparatus of FIG. 5.

FIGS. 5–7 show an alternative embodiment of the present invention. A retaining apparatus 40 is shown, which can likewise be used for securely and safely storing eyeglasses. In addition papers, or the like may be held in the retaining apparatus 40. The apparatus 40 is preferably mounted on a relatively thin, planar structure, such as a sun visor in an automobile.

The retaining apparatus 40 more specifically comprises a continuous piece of resilient, flexible material, which may comprise spring steel, plastic, or other type of suitable resilient material. The retaining apparatus 40 includes a pair of mounting clip legs 42 extending integrally from an apex location 50, a pair of main legs 44 attached to the mounting legs 42 at apex locations 50, and a pair of retaining clip legs 46 extending from the main legs 44 at apex locations 52. The mounting legs 42 and the main legs 44 define a retaining area 43 for mounting the retaining apparatus to a support structure. The main legs 44 and retaining legs 46 define a retaining area 45 for holding a particular item, such as sunglasses or the like. A loop handle is formed by a pair of horseshoe legs 48 extending from an apex location 56. The retaining legs 46 and horseshoe legs join at apex locations 54. The horseshoe legs 48 provide a grasping location to displace the retaining legs 46 relative to the main legs 44 for inserting an object to be held within the retaining clip 40. The object to be held within retaining area 45 must have a minimum dimension greater than the separation distance 55 between apex location 54 and the main legs 44. Of course, for insertion of the object into the retaining area 45, the separation distance 55 will increase upon displacement of legs 46.

A protective rubber cover 60 is placed over the first legs 42 in an abutting relationship with the first apex location 50. The rubber cover 60 will prevent any scratching or damage to the structure mounting the retaining clip 40.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A retaining apparatus for holding eyeglasses, comprising:

a main body portion having a first end and a second end;

a mounting clip coupled to the first end of the main body portion;

a retaining clip comprising an inclined section, an apex, and a return section, the inclined section being coupled to the second end of the main body portion, the inclined section extending at an acute angle away from the main body portion, the inclined section terminating at the apex, the return section extending from the apex reward toward the main body portion;

a mounting area formed between the retaining clip and the main body portion for mounting the retaining apparatus to a support structure;

a retaining area formed between the retaining clip and the main body portion, the retaining area sized to hold a pair of eyeglasses including a pair of attached, articulable temples within the retaining area such that the temples are supportedly engaged by the main body portion thereby preventing relative movement between the eyeglasses and the retaining apparatus.

2. A retaining apparatus according to claim 1 wherein the retaining clip and the mounting clip are mounted to the main body portion to extend over opposite sides of the main body portion.

3. A retaining apparatus according to claim 1 wherein the retaining clip and the mounting clip are resiliently displaceable relative to the main body portion to enable retention within the retaining area and mounting within the mounting area, respectively.

4. A retaining apparatus according to claim 1 wherein the retaining clip and the mounting clip are attached to the main body portion in a tortuous manner, the retaining clip and the mounting clip being mounted to the main body portion to extend over opposite sides of the main body portion.

5. A retaining apparatus according to claim 1 wherein the retaining clip is relatively narrow and the mounting clip is relatively wide.

6. A retaining apparatus according to claim 1 wherein the main body portion has a main body width and the mounting clip has a mounting clip width, the main body width and the mounting clip width being substantially the same.

7. A retaining apparatus according to claim 1 wherein the main body portion has a main body width and the mounting clip has a mounting clip width, the main body width and the mounting clip width being substantially the same, the retaining clip being relatively narrow as compared to the mounting clip width and the main body width.

8. A retaining apparatus according to claim 1 wherein the mounting clip and main body portion define a first separation distance and the retaining clip and the main body portion define a second separation distance.

9. A retaining apparatus according to claim 1 wherein the mounting clip and main body portion define a first separation distance and the retaining clip and the main body portion define a second separation distance, the first separation distance being less than the second separation distance.

10. A retaining apparatus according to claim 1 wherein the mounting clip and main body portion define a first separation distance and the retaining clip and the main body portion define a second separation distance, the first separation distance being less than the second separation distance, the mounting clip being resiliently displaceable relative to the main body portion to allow the retaining apparatus to be mounted to a support shelf within the mounting area, the retaining clip being resiliently displaceable relative to the main body portion to allow a pair of eyeglasses to be held within the retaining area.

11. A retaining apparatus according to claim 1 wherein the retaining area is cross-sectionally greater than the mounting area.

12. A retaining apparatus according to claim 1 wherein the retaining clip is relatively narrow and the mounting clip is relatively wide, the retaining clip being less than one-half as wide as the mounting clip.

13. A retaining apparatus according to claim 1 wherein the retaining clip, the mounting clip, and the main body portion are integrally formed in a tortuous manner, the retaining clip and the mounting clip being resiliently displaceable relative to the main body portion at respective apex locations.

14. A retaining apparatus for holding eyeglasses, comprising:

a main body portion having a first end and a second end;

a mounting clip coupled to the first end of the main body portion;

a retaining clip comprising an inclined section, an apex, and a return section, the inclined section being coupled to the second end of the main body portion, the inclined section extending at an acute angle away from the main body portion, the inclined section terminating at the apex, the return section extending from the apex toward the main body portion;

a mounting area formed between the mounting clip and the main body portion for mounting the retaining apparatus to a support structure;

a retaining area formed between the retaining clip and the main body portion, the retaining area sized to hold a pair of eyeglasses including a pair of attached, articulable temples within the retaining area such that the temples are supportedly engaged by the main body portion thereby preventing relative movement between the pair of eyeglasses and the retaining apparatus;

the retaining clip, the mounting clip, and the main body portion being integrally formed in a tortuous manner, the retaining clip and the mounting clip being resiliently displaceable relative to the main body portion.

15. A retaining apparatus according to claim 14 wherein the retaining clip and the mounting clip are mounted to the main body portion to extend over opposite sides of the main body portion.

16. A retaining apparatus according to claim 14 wherein the retaining clip and the mounting clip are resiliently displaceable relative to the main body portion to enable retention within the retaining area and mounting within the mounting area, respectively.

17. A retaining apparatus according to claim 14 wherein the retaining clip is relatively narrow and the mounting clip is relatively wide.

18. A retaining apparatus according to claim 14 wherein the main body portion has a main body width and the mounting clip has a mounting clip width, the main body width and the mounting clip width being substantially the same.

19. A retaining apparatus according to claim 14 wherein the main body portion has a main body width and the mounting clip has a mounting clip width, the main body width and the mounting clip width being substantially the same, the retaining clip being relatively narrow as compared to the mounting clip width and the main body width.

20. A retaining apparatus according to claim 14 wherein the mounting clip and main body portion define a first separation distance and the retaining clip and the main body portion define a second separation distance.

21. A retaining apparatus according to claim 14 wherein the mounting clip and main body portion define a first separation distance and the retaining clip and the main body portion define a second separation distance, the first separation distance being less than the second separation distance.

22. A retaining apparatus according to claim 14 wherein the mounting clip and main body portion define a first separation distance and the retaining clip and the main body portion define a second separation distance, the first separation distance being less than the second separation distance, the mounting clip being resiliently displaceable relative to the main body portion to allow the retaining apparatus to be mounted to a support shelf within the mounting area, the retaining clip being resiliently displaceable relative to the main body portion to allow a pair of eyeglasses to be held within the retaining area.

23. A retaining apparatus according to claim 14 wherein the retaining area is cross-sectionally greater than the mounting area.

24. A retaining apparatus according to claim 14 wherein the retaining clip is relatively narrow and the mounting clip is relatively wide, the retaining clip being less than one-half as wide as the mounting clip.

25. A pair of eyeglasses and a retaining apparatus for holding the eyeglasses, comprising:

a pair of eyeglasses including a pair of attached, articulable temples;

a retaining apparatus including a main body portion having a first end and a second end;

a mounting clip coupled to the first end of the main body portion;

a retaining coupled to the second end of the main body portion;

a mounting area formed between the mounting clip and the main body portion for mounting the retaining apparatus to a support structure;

a retaining area formed between the retaining clip and the main body portion, the retaining area sized to hold the pair of eyeglasses including the pair of attached, articulable temples within the retaining area such that the temples are supportedly engaged by the main body portion thereby preventing relative movement between the pair of eyeglasses and the retaining apparatus.

* * * * *